United States Patent [19]

Cunningham

[11] Patent Number: 4,577,466
[45] Date of Patent: Mar. 25, 1986

[54] BY-PRODUCTS CHILLER AND METHOD FOR USING SAME

[76] Inventor: Larry L. Cunningham, P.O. Box 142, Murray, Nebr. 68409

[21] Appl. No.: 748,917

[22] Filed: Jun. 26, 1985

[51] Int. Cl.⁴ ............................................. F25D 13/06
[52] U.S. Cl. ......................................... 62/63; 62/64; 62/374; 62/375; 62/381
[58] Field of Search ...................... 62/63, 64, 374, 375, 62/380, 381

[56] References Cited

U.S. PATENT DOCUMENTS

| | | | |
|---|---|---|---|
| 2,794,326 | 6/1957 | Menacci | 62/375 |
| 3,015,219 | 1/1962 | Veyrie | 62/63 |
| 3,092,975 | 6/1963 | Zebarth | 62/375 |
| 3,097,501 | 7/1963 | Pappas | 62/63 |
| 3,213,634 | 10/1965 | Granata | 62/63 |
| 3,395,549 | 8/1968 | Grimes | 62/63 |
| 3,410,101 | 11/1968 | Morris, Jr. | 62/375 |
| 3,426,546 | 2/1969 | Crane | 62/375 |
| 3,446,030 | 5/1969 | Rubin | 62/63 |
| 3,488,973 | 1/1970 | Harben, Jr. et al. | 62/375 |
| 3,498,208 | 3/1970 | Longe et al. | 62/375 |
| 3,555,838 | 1/1971 | Morris, Jr. | 62/375 |
| 3,623,331 | 11/1971 | Buyens | 62/63 |
| 3,906,743 | 9/1975 | Schorsch et al. | 62/374 |
| 3,942,429 | 6/1960 | Van Dolah et al. | 62/375 |
| 3,992,899 | 11/1976 | Spahn | 62/381 |

Primary Examiner—Ronald C. Capossela
Attorney, Agent, or Firm—E. Robert Newman

[57] ABSTRACT

A packing plant by-products chiller includes an elongated tank having an inlet end for introducing fresh animal by-products and an outlet end for removing chilled by-products. The tank is rotatably supported on a set of trunnion wheels and is rotated by a chain by sprocket assembly operatively connected to a motor. A liquid coolant supply line from a coolant source introduces low temperature coolant into the tank. An elongated through is positioned beneath the tank for receiving warmed coolant which drains from the tank through a plurality of apertures therein. A pump is operatively connected to the through for recirculating the coolant back to the coolant source. The method of chilling fresh animal by-products comprises introducing the by-products and liquid coolant from the coolant source into the chilling tank located at the slaughter location and rotating the tank such that the by-products therein are tumbled for complete exposure to the coolant. The by-products are pushed through the tank by additional incoming by-products and by the incoming liquid coolant. The coolant drains through the apertures in the tank into the receiving trough and is then recirculated by a pump to the coolant source where the coolant is recooled for subsequent use in chilling additional by-products. Chilled by-products are then stored until a sufficient quantity for shipping to a remote location for processing is accumulated.

18 Claims, 8 Drawing Figures

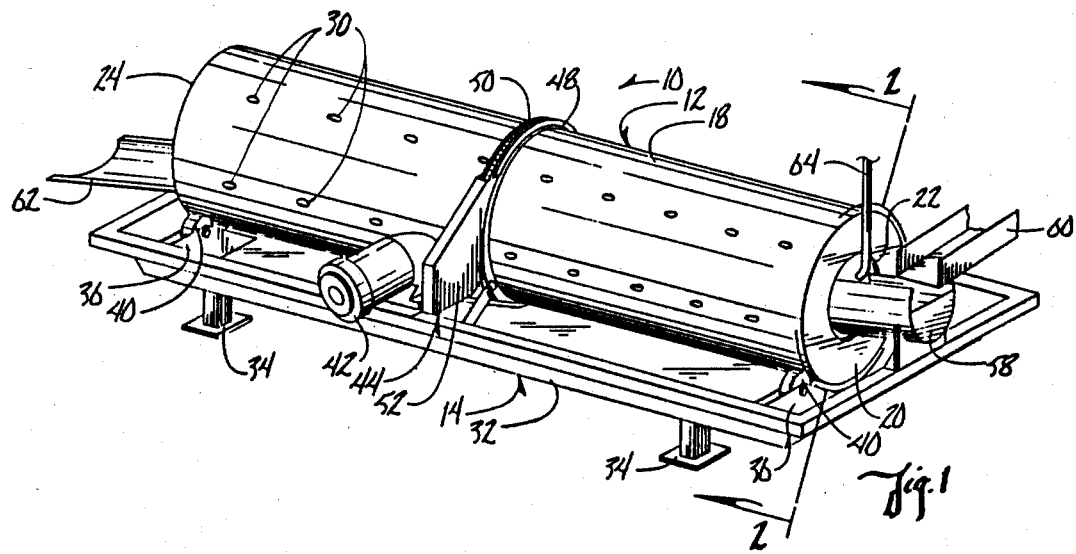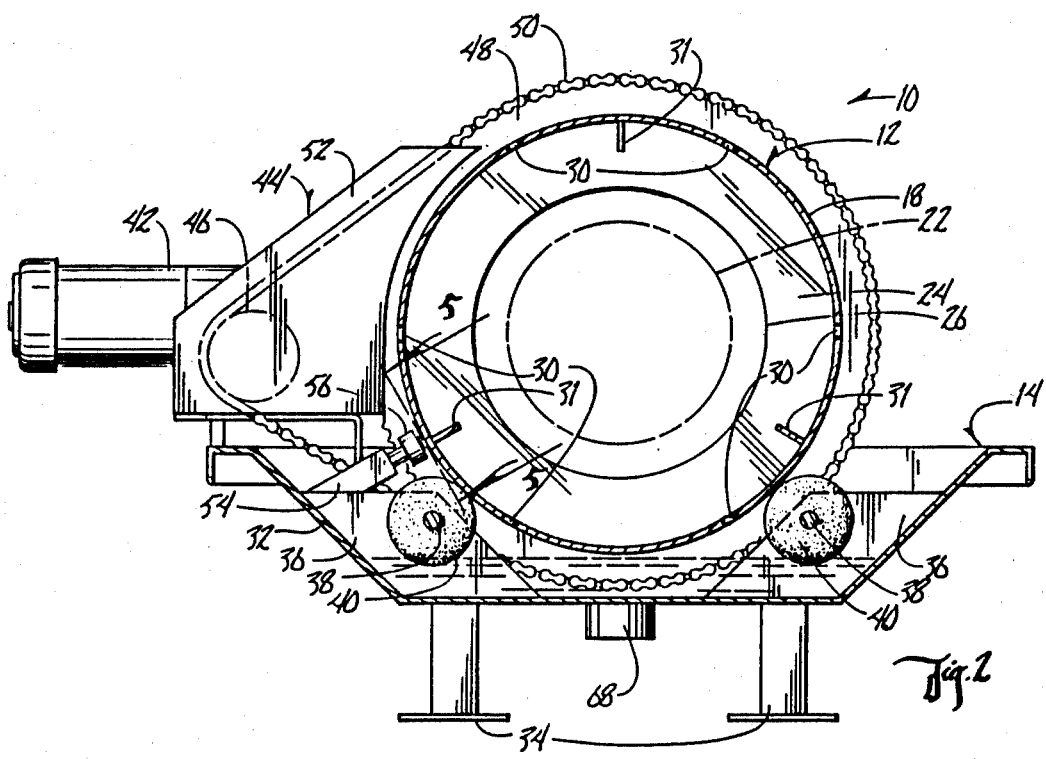

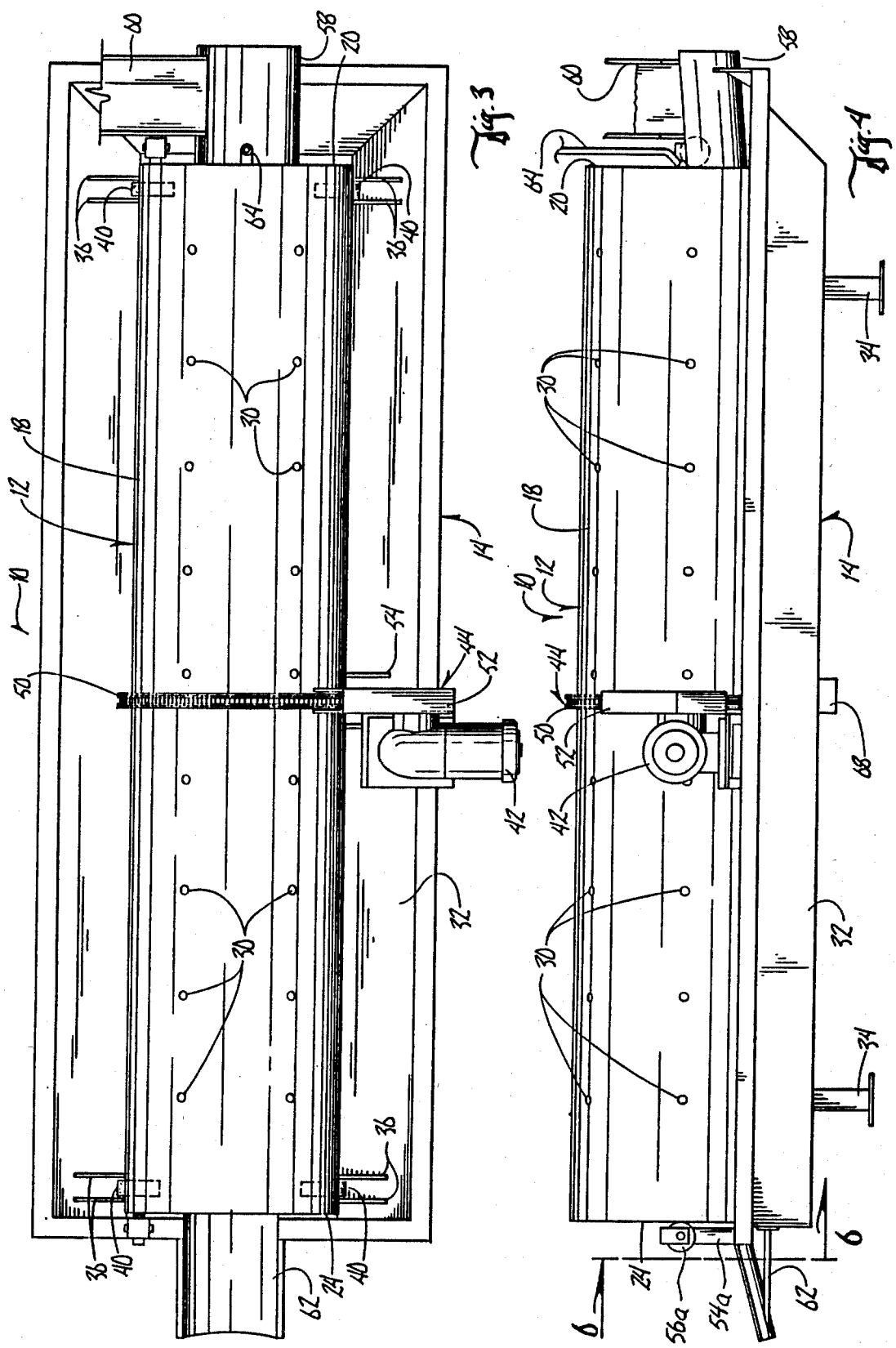

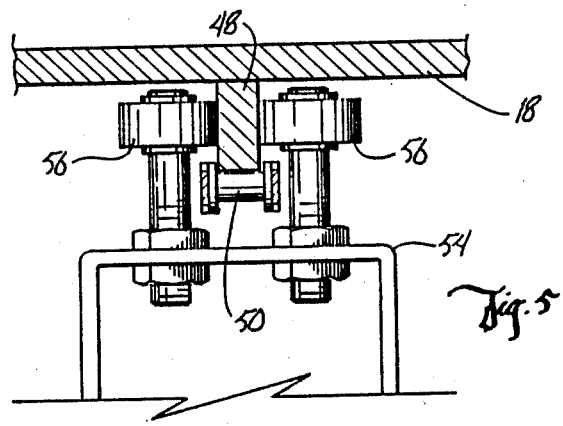
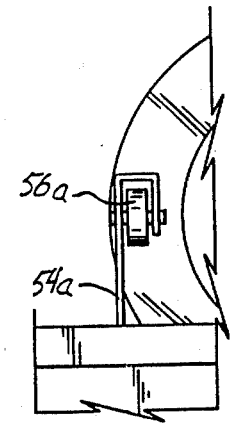
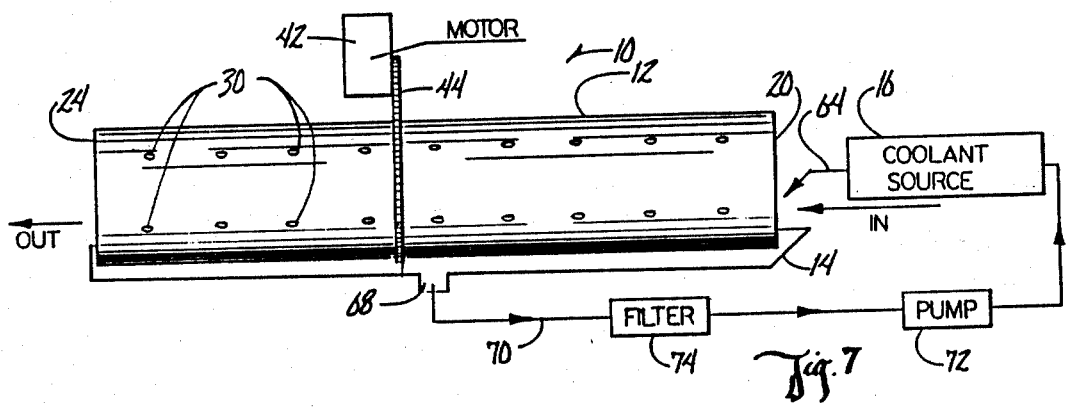
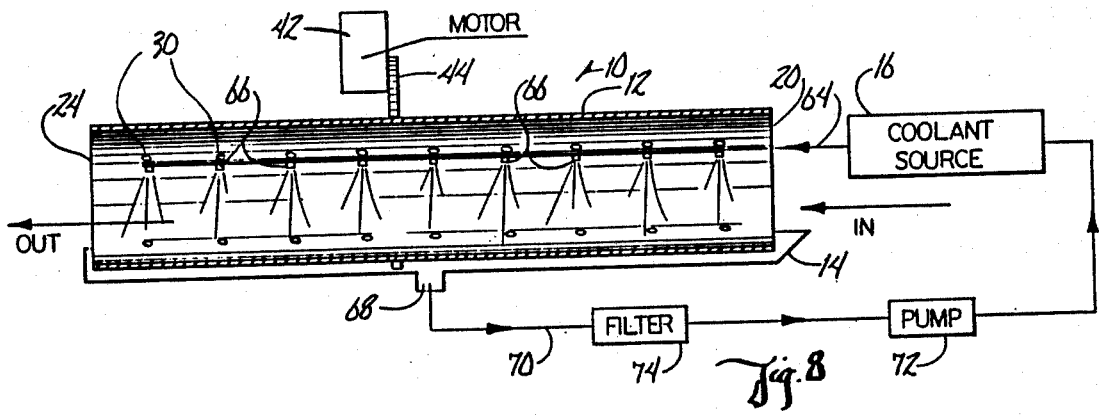

BY-PRODUCTS CHILLER AND METHOD FOR USING SAME

TECHNICAL FIELD

The present invention relates generally to apparatuses and methods for chilling beef and/or pork by-products immediately after slaughter for purposes of accumulating a commercially viable shipping load and preservation thereof during shipping to a remote processing plant. More particularly it relates to a continuous flow chilling apparatus and method of using it.

BACKGROUND ART

Packing plant by-products, such as lungs, kidneys, hearts and other parts generally not consumed by humans of both beef and pork, are often sold and used to make pet food. These by-products are initially at the body temperature of the butchered animal when removed therefrom, and are therefore highly susceptible to spoilage. Due to such potential for spoilage, the by-products have a very short life. The warm by-products must be quickly transported from the packing plant which slaughters the animal to the remote processing plant for conversion into pet food. Without such hurried pick up and delivery, the by-products become spoiled and must be discarded.

Because such rush pick-up and delivery is rarely feasible, packing plants have had to use either cooler storage or dry ice to chill the product while a sufficient quantity to comprise a shipping load accumulates. To adequately chill such products in a walk-in cooler, it is necessary to hang the product on racks so as to immediately expose all surfaces to the chilled air. If the product freezes it has to be further processed or allowed to thaw before processing, making the control of the cooler temperature critical. Similarly, the use of dry ice entails boxing and careful monitoring in order to avoid freezing. Boxes used for this purpose are expensive and the cost of dry ice is roughly 35% to 40% of the value of the product. Losses due to inadvertent freezing is practically unavoidable.

DISCLOSURE OF THE INVENTION

It is an objective of this invention to provide an improved by-products chiller and an improved method of chilling by-products.

It is another object of the present invention to provide an on-site by-products chiller for lowering the temperature of fresh by-products, and thereby reducing potential for spoilage.

A further objective of the present invention is the provision of an on-site method and apparatus for chilling by-products which will prolong the life of by-products for further processing.

A further objective of the present invention is the provision of a method and apparatus for chilling animal by-products at the point of slaughter such that the by-products can be stored without spoilage prior to being shipping for further processing.

A further objective of the present invention is the provision of a method and apparatus for chilling by-products which eliminates the need to quickly transport the fresh by-products from the packing plant to the remote processing plant.

Another objective of the present invention is the provision of a by-products chiller and method for using the same wherein by-products are introduced into the chiller and exposed to a liquid coolant which reduces the temperature of the by-products prior to their exit from the chiller.

Still a further objective of the present invention is the provision of a by-products chiller and method for using the same which recirculates and reuses the liquid coolant for cooling the by-products therein.

Yet another objective of this invention is to provide a by-products chiller and method which substantially eliminates risk of freezing.

A further objective of the present invention is the provision of a by-products chiller and a method for using the same which is economical to manufacture, and durable and efficient to use.

In a more general sense, it is an object of the present invention to provide an elongated cylindrical tank having an inlet and an outlet end through which fresh animal by-products are passed. By products pass into the tank through a centered circular opening in the inlet end and out through a centered circular opening in the outlet end of larger diameter, thus providing a drop in elevation between inlet and outlet. The tank is rotatably supported on trunnion wheels and is rotated by a chain and sprocket gear assembly. A liquid coolant from a coolant source is introduced into the tank through a hose adjacent the inlet end thereof or through a plurality of nozzles positioned within the tank along the length thereof. The tank includes a plurality of agitator baffles extending along the length thereof to facilitate the tumbling of the by-products within the tank as the tank is rotated. A plurality of apertures in the tank permits the coolant therein to drain into a trough, whereafter the coolant is filtered and pumped back to the coolant source for recooling and subsequent reuse in cooling additional by-products in the tank.

The method of preserving the perishable by-products includes introducing the fresh by-products into the chilling tank at the packing plant immediately after the animal has been slaughtered. Low temperature coolant is introduced into the tank which is rotated so as to expose the warm by-products therein to the coolant whereby the by-products are chilled. The by-products are forced through the tank by additional incoming by-products and coolant. The coolant drains through the apertures in the tank and is recirculated for chilling additional fresh by-products. The chilled by-products are then accumulated until ready for shipping.

These and other objects, advantages and novel features of the present invention will become apparent from the following detailed description of the invention when considered in conjunction with the accompanying drawings.

BRIEF DESCRIPTION OF THE DRAWINGS

FIG. 1 is an isometric view of the by-products chiller tank of the present invention;

FIG. 2 is an end view taken along lines 2—2 of FIG. 1;

FIG. 3 is a top plan view of the by-products chiller tank;

FIG. 4 is a side elevational view of the by-products chiller tank;

FIG. 5 is an enlarged sectional view taken along lines 5—5 of FIG. 2 showing the guidance rollers of the tank;

FIG. 6 is a view taken along line 6—6 of FIG. 4;

FIG. 7 is a schematic of the by-products chiller assembly of the present invention; and FIG. 8 is a schematic section showing an alternate embodiment of the by-products chiller assembly of the present invention.

BEST MODE FOR CARRYING OUT THE INVENTION

The by-products chiller of the present invention is generally designated in the drawings by the reference numeral 10. Chiller 10 is located at the packing plant where the animals are slaughtered, and basically comprises an elongated chilling tank 12 rotatably mounted above a drainage trough 14 and a liquid coolant supply source 16 (see FIGS. 7 and 8).

Referring to FIGS. 1–4, tank 12 includes a cylindrical body 18 having a first end 20 with an inlet opening 22 therein and a second end 24 with an outlet opening 26 therein. Both openings 22 and 24 are centered in their respective ends. Inlet opening 22 has a smaller diameter than outlet opening 24, thereby promoting the advance of by-product through the tank. Body 18 of tank 12 is of single wall construction and has a plurality of apertures 30 therein for draining liquid coolant from the tank. Tank 12 also has a plurality of baffles 31 extending inwardly from the interior of body 18 along the length thereof.

Trough 14 includes a large receptacle 32 mounted upon a plurality of legs 34 and is positioned beneath tank 12. Each end of receptacle 32 has two pairs of ears 36 extending inwardly from the side walls thereof, each pair of which supports an axle 38 upon which a trunnion wheel 40 is rotatably mounted. Each pair of trunnion wheels 40 at each end of receptacle 32 is positioned one on each side of tank 12 and serves to support tank 12 for rotation thereon. Legs 34 may be adjustable such that tank 12 may be inclined along its longitudinal axis.

Chiller 10 includes a means for rotating tank 12 about its longitudinal axis as it is supported by trunnion wheels 40. Referring to FIG. 2, the rotation means generally comprises a motor 42 and a chain and sprocket assembly 44. More particularly, motor 42 is mounted upon trough 14 and has a first sprocket 46 conventionally and operatively connected thereto. A second sprocket 48 such that actuation of motor 42 causes tank 12 to rotate about its longitudinal axis. A housing 52 is attached to trough 14 so as to cover first sprocket 46 and at least a portion of chain 50 for safety purposes.

Also mounted upon trough 14 adjacent chain and sprocket assembly 44 is a bracket 54 to which are bolted a pair of guide rollers 56, as seen in FIG. 5. Guide rollers 56 engage opposite sides of second sprocket 48 so as to prevent tank 12 from moving longitudinally as the tank rotates upon trunnion wheels 40. As an alternative to brackets 54 and guide rollers 56, bracket 54a can be mounted at each end of tank 12 with a guide roller 56a rotatably mounted thereon, as shown in FIGS. 4 and 6. In this manner the ends of tank 12 are engaged and prevented from moving longitudinally during rotation.

An inlet chute 58 extends through inlet opening 22 so as to deposit animal by-products from a conveyor 60 to the interior of tank 12. The by-products are removed from tank 12 via an outlet chute 62 extending from outlet opening 26 of tank 12.

A coolant supply line 64 extends from coolant source 16 at least to chute 58 and supplies a liquid coolant, such as water, from coolant source 16. In the embodiment shown in FIGS. 1–4 and 7, coolant supply lines 64 terminates adjacent first end 20 of tank 12.

In an alternate embodiment, as seen in FIG. 8, line 64 extends along the length of tank 12 and includes a plurality of spray nozzles 66 for uniform distribution of coolant throughout tank 12. There are other advantages of spray nozzles 66. By-products being chilled are generally a mixture of the various organs, including lungs. Lungs, containing air, will float atop the water. The tendency of the air to insulate the insides of the lungs is overcome by direct exposure to the spray.

Also, the lower elevation of outlet opening 24 serves as an overflow drain to openings 30 for coolant water, thereby maintaining the water level low in tank 12. This low level of coolant water, in conjunction with the tumbling of product, as assisted by baffles 31, creates a condition in which an abundance of coolant is moved through tank 12, permitting the average temperature thereof to remain just above freezing and the by-products to continually come in contact with the spray water. In this embodiment it is not difficult to introduce coolant at a constant 33 degrees Fahrenheit and remove it at about 36 degrees Fahrenheit.

Trough 14 also includes a drain 68 for draining coolant from receptacle 32. A coolant return line 70 is connected to drain 68 at one end and to coolant source 16 at the other end. A pump 72 is disposed in return line 70 for pumping coolant from receptacles 32 to coolant source 16. A filter 74 is disposed in return line 70 upstream of pump 72 for removing solids from the liquid coolant. The coolant which is passed through tank 12 and trough 14 is thereby recirculated back to coolant source 16, wherein it is cooled for subsequent reuse in chilling additional by-products.

In the packing plant chilling operation, quantity of fresh animal by-products are deposited on inlet chute 58 from conveyor 60 wherein they pass through inlet opening 22 into tank 12. Liquid coolant at approximately 33 degrees Fahrenheit from coolant source 16 is also introduced into tank 12 for lowering the temperature of the hot by-products. Tank 12 is rotated upon trunnion wheels by motor 42 and chain and sprocket assembly 44. Such rotation of tank 12 causes the by-products therein to tumble so as to be completely exposed to the lower temperature coolant, as facilitated by baffles 31. Introduction of additional by-products and coolant pushes the previously introduced by-products through tank 12 and out outlet opening 26 onto outlet chute 62 wherein the by-products are removed for stockpiling until a commercially feasible load for shipping to a remote processing plant is accumulated.

As the by-products and coolant moves longitudinally through tank 12, the coolant picks up heat from the by-products, thereby lowering the temperature of the by-products and reducing the potential for spoilage. The warmed coolant drains from rotating tank 12 through apertures 30 and into receptacle 32. The warmed coolant in receptacle 32 can be drained through drain 68 into return line 70 and pumped by pump 72 back to coolant source 16. Coolant source 16 includes a cooling means (not shown) for re-cooling the coolant to approximately 33 degress Fahrenheit such that the coolant can be reused to chill additional by-products. As selected periodic intervals, the used coolant can be disposed and replaced with fresh coolant.

During the on-site chilling operation of the present invention, the by-products remain in tank 12 for approximately ten to twelve minutes. The coolant temperature entering tank 12 is initially 3 degrees Fahrenheit such that the final temperature of the by-products exiting tank 12 through outlet opening 26 therein is substantially less than the warm body temperature of the slaughtered animal at which the by-products enter tank 12. The chance of spoilage is therefore minimized and the life of the by-products is prolonged. Thus, the need to rush the warm by-products from the packing plant to the remote processing plant is eliminated.

It will be readily understood that the particular disposition or arrangement or nature of the elements of the invention are not of the essence of the invention, and that many variations, substitutions, and modifications may be made, in departure from their particular construction and characterization in the drawings and foregoing description, without departing from the true spirit of the invention. It is therefore to be understood that the invention should be limited only by the breadth and scope of the appended claims.

What is claimed is:

1. A by-product chiller comprising:
    an elongated cylindrical tank having an inlet end for introducing fresh animal by-products into said tank and an outlet end for removing said by-products from said tank;
    support means for rotatably supporting said tank;
    means for introducing a liquid coolant from a coolant source into said tank;
    an elongated rectangular trough, being larger in width and breadth than the longitudinal cross-section of said tank and centered therebelow, said tank having a plurality of rows of circumferentially spaced apertures therein, whereby said coolant will drain from said tank more or less evenly across its width and breadth into said trough;
    pump means operatively connected to said trough for recirculating said coolant to said coolant source for recooling thereby; and
    means operatively connected to said tank for rotating said tank about its longitudinal axis such that said by-products are tumbled within said tank for exposure to said coolant and chilled thereby.

2. The chiller of claim 1 wherein said means for rotating said tank includes a first sprocket circumferentially mounted on said tank intermediate the opposite ends thereof, a power means having a rotatable drive sprocket operatively connected thereto, and a chain means drivingly interconnecting said drive sprocket and said first sprocket.

3. The chiller of claim 2 further comprising stabilizer means engaging said tank for preventing said tank from moving longitudinally while rotating.

4. The chiller of claim 1 wherein said means for introducing said coolant into said tank includes a plurality of spray nozzles positioned within said tank along the length thereof and being in fluid communication with said coolant source.

5. The chiller of claim 4 wherein said tank includes a plurality of agitator baffles extending longitudinally along the interior thereof.

6. The chiller of claim 4 wherein said inlet end of said tank includes an inwardly directed annular flange, whereby there is created a continual movement of by-products through said tank and out its outlet end so long as by-products are introduced.

7. The chiller of claim 6 wherein said outlet end of said tank includes an inwardly directed annular flange of lesser depth than said inlet end annular flange, whereby substantially all liquid coolant may be drained through the apertures of said tank.

8. The chiller of claim 1 wherein said tank includes a plurality of agitator baffles extending longitudinally along the interior thereof.

9. The chiller of claim 8 wherein said inlet end of said tank includes an inwardly directed annular flange, whereby there is created a continual movement of by-products through said tank and out its outlet end so long as by-products are introduced.

10. The chiller of claim 9 wherein said outlet end of said tank includes an inwardly directed annular flange of lesser depth than said inlet end annular flange, whereby substantially all liquid coolant may be drained through the apertures of said tank.

11. The chiller of claim 1 wherein said inlet end of said tank includes an inwardly directed annular flange, whereby there is created a continual movement of by-products through said tank and out its outlet end so long as by-products are introduced.

12. The chiller of claim 11 wherein said outlet end of said tank includes an inwardly directed annular flange of lesser depth than said inlet end annular flange, whereby substantially all liquid coolant may be drained through the apertures of said tank.

13. A method of preserving fresh animal by-products which are to be further processed, comprising;
    introducing warm by-products into an elongated chilling tank at the slaughter vicinity;
    introducing liquid coolant from a coolant source into said tank;
    rotating said tank such that said by-products are tumbled therein for exposure to said coolant whereby heat is transferred from said by-products to said coolant thereby chilling said by-products to eliminate spoilage thereof;
    recirculating said coolant through spaced apertures in said tank into a trough therebelow and then to said coolant source for recooling thereby, whereafter said coolant is reused for chilling additional by-products; and
    storing the chilled by-products at the slaughter vicinity until said chilled by-products are transported for further processing.

14. The method of claim 13 wherein said elongated tank has centered circular openings at either end, the circular opening at the outlet end of said tank being the larger, whereby the introduction of said by-products into said tank forces previously introduced by-products through said tank.

15. The method of claim 13 wherein said coolant is introduced into said tank through a plurality of spray nozzles positioned therein.

16. The method of claim 13 wherein said elongated tank has a plurality of interior longitudinally extending agitator baffles, whereby the tumbling of said by-product is facilitated.

17. The method of claim 13 wherein the temperature of said coolant from said coolant source is approximately 33 degrees Fahrenheit.

18. The method of claim 13 wherein said by-products remain in said tank for approximately ten to twelve minutes.

* * * * *

UNITED STATES PATENT AND TRADEMARK OFFICE
CERTIFICATE OF CORRECTION

PATENT NO. : 4,577,466
DATED      : March 25, 1986
INVENTOR(S): Larry L. Cunningham It is certified that error appears in the above-identified patent and that said Letters Patent is hereby corrected as shown below:

In the Abstract, at line 10, delete "through" and substitute therefor --trough--; and at line 13, delete "through" and substitute --trough--.
In the specification, column 4 at line 67, delete "3" and substitute therefor --33--.

Signed and Sealed this

Twenty-ninth Day of July 1986

[SEAL]

Attest:

DONALD J. QUIGG

Attesting Officer

Commissioner of Patents and Trademarks